United States Patent
Kim et al.

(10) Patent No.: US 9,471,836 B1
(45) Date of Patent: Oct. 18, 2016

(54) METHOD FOR LEARNING REJECTOR BY FORMING CLASSIFICATION TREE IN USE OF TRAINING IMAGES AND DETECTING OBJECT IN TEST IMAGES, AND REJECTOR USING THE SAME

(71) Applicant: StradVision, Inc., San Jose, CA (US)

(72) Inventors: Hak-Kyoung Kim, Gyeongsangbuk-do (KR); Woonhyun Nam, Gyeongsangbuk-do (KR)

(73) Assignee: StradVision Korea, Inc., Pohang, Gyeongbuk (KR)

( * ) Notice: Subject to any disclaimer, the term of this patent is extended or adjusted under 35 U.S.C. 154(b) by 0 days.

(21) Appl. No.: 15/088,446

(22) Filed: Apr. 1, 2016

(51) Int. Cl.
*G06K 9/62* (2006.01)
*G06K 9/00* (2006.01)
*G06K 9/46* (2006.01)

(52) U.S. Cl.
CPC ......... *G06K 9/00536* (2013.01); *G06K 9/4642* (2013.01); *G06K 9/6201* (2013.01); *G06K 9/6212* (2013.01); *G06K 9/6265* (2013.01); *G06K 9/6267* (2013.01)

(58) Field of Classification Search
None
See application file for complete search history.

(56) References Cited

U.S. PATENT DOCUMENTS

| | | | | |
|---|---|---|---|---|
| 8,150,119 B2* | 4/2012 | Zheng | ...................... | G06K 9/34 345/419 |
| 2009/0190811 A1* | 7/2009 | Zheng | ...................... | G06K 9/34 382/128 |
| 2014/0270364 A1* | 9/2014 | Baranowski | ......... | G06K 9/6285 382/103 |
| 2014/0270551 A1* | 9/2014 | Baranowski | ......... | G06K 9/6285 382/226 |
| 2015/0254848 A1* | 9/2015 | Ozaki | .................. | G02B 21/244 382/128 |

\* cited by examiner

*Primary Examiner* — Feng Niu
(74) *Attorney, Agent, or Firm* — Husch Blackwell LLP

(57) ABSTRACT

A method for learning a rejector is provided. The method includes steps of: acquiring features from positive images and negative images of the classification tree; and deciding a specific feature ID and a specific threshold by which a minimum classification error is derived by referring to a histogram of features of positive images and that of features of negative images if a number of images classified to a k-th node is larger than that classified to a brother node of the k-th node as a result of classifying images acquired with respect to a parent node of the k-th node based on a determined feature ID and a determined threshold for the parent node and then allocating the specific feature ID and the specific threshold in nodes, which have depth equal to the k-th node of the classification tree.

22 Claims, 7 Drawing Sheets

METHOD FOR LEARNING REJECTOR BY FORMING CLASSIFICATION TREE IN USE OF TRAINING IMAGES AND DETECTING OBJECT IN TEST IMAGES, AND REJECTOR USING THE SAME

FIELD OF THE INVENTION

The present invention relates to a method for learning a rejector by forming at least one classification tree with training images and detecting an object in test images and the rejector using the same; and more particularly, to the method for (1) learning the rejector by (a) acquiring or supporting to acquire p features from mk respective positive images and nk respective negative images if the mk positive images and the nk negative images are acquired with respect to a k-th node (k>=1 as an integer) of the classification tree; performing processes of: (b) (i) deciding or supporting to decide a feature ID and a threshold by which a minimum classification error is derived by referring to a histogram of features of m1 positive images and that of features of n1 negative images if the number k is 1, wherein the feature ID is selected among the p feature IDs, and (ii) deciding or supporting to decide a specific feature ID and a specific threshold by which a minimum classification error is derived by referring to a histogram of features of the mk positive images and that of features of the nk negative images if the number k is equal to or greater than 2 and if the number of images classified to the k-th node is larger than that classified to a brother node of the k-th node as a result of classifying images acquired with respect to a parent node of the k-th node based on a determined feature ID and a determined threshold for the parent node and then allocating the specific feature ID and the specific threshold in nodes, which have depth equal to the k-th node of the classification tree; and (2) classifying test images by using the learned rejector if the test images are acquired and thereby detecting an object in the test images based on the classification result; and the rejector using the same.

BACKGROUND OF THE INVENTION

Today, techniques for object detection or object recognition have been developed and they are applied to a variety of electronic devices. The object detection techniques or the object recognition techniques learn classifiers by using acquired training images, and detect or recognize test images by classifying the test images with the learned classifiers.

FIG. 1 is a drawing exemplarily illustrating a course of classifying objects with a classifier according to a conventional art.

By referring to FIG. 1, positive features are extracted from inputted positive images at a step of S10. The positive images mean images in which an object intended to be detected or recognized exists at a specific size at a specified location. However, in case of test images which are not training images, the object would be placed at any size and at any location in the images. A feature as a value representing a characteristic of an image pixel may be an intensity value of a pixel in accordance with one example embodiment.

Next, the extracted positive features may be converted. Such conversion of the features represents the change in characteristics of the features differently. For example, a classification system may create new features by converting an input image with RGB channels through Principal Component Analysis (PCA), Linear Discriminant Analysis (LDA), and Canonical Correlation Analysis (CCA).

Negative images may be acquired from a negative image pool 200 at a step of S30. Herein, the negative images may be images at random sizes in which there is no object that is intended to be detected or recognized. Hard negative images may be selected from the acquired negative images. A hard negative image represents a negative image which is mistaken or is highly likely to be mistaken for a positive image by the classifier.

Just like the positive images, hard negative features may be extracted from the hard negative images at a step of S40. The extracted hard negative features may be converted.

The classifier may classify inputted images by using at least one classification tree at steps of S20 and S50.

In addition, a bootstrapping process capable of finding the hard negative images which are more difficult to be segregated from the positive images in the negative image pool 200 may be performed at a step of S60.

A detector is configured by including at least one classifier and such a detector or a classifier is required to be learned by using training images.

But the conventional detector has drawbacks in that it requires a longer time to classify because respective feature IDs and thresholds for respective nodes of a classification tree are different from each other, and it has a lower efficiency because of a large model size.

SUMMARY OF THE INVENTION

It is an object of the present invention to solve all the aforementioned problems.

It is another object of the present invention to propose a configuration of a rejector that may increase a classification speed by allocating a same feature ID and a same threshold in nodes which have a same depth from a root node in a classification tree and improve object recognition efficiency by reducing its model size.

It is still another object of the present invention to improve an object detection speed while maintaining an accuracy of object detection by placing the rejector at a front-end of a detector.

It is still yet another object of the present invention to propose a configuration of the rejector capable of performing parallel processing rapidly by referring to an order of identical feature ID sets and that of identical threshold sets regardless of a path of the classification tree with respect to consecutive test images.

In accordance with one aspect of the present invention, there is provided a method for learning a rejector by forming at least one classification tree with training images, including steps of: (a) a rejector acquiring or supporting to acquire p features from mk respective positive images and nk respective negative images if the mk positive images and the nk negative images are acquired with respect to a k-th node (k>=1 as an integer) of the classification tree; and (b) the rejector performing processes of: (i) deciding or supporting to decide a feature ID and a threshold by which a minimum classification error is derived by referring to a histogram of features of m1 positive images and that of features of n1 negative images if the number k is 1, wherein the feature ID is selected among the p feature IDs; and (ii) the rejector deciding or supporting to decide a specific feature ID and a specific threshold by which a minimum classification error is derived by referring to a histogram of features of the mk positive images and that of features of the nk negative images if the number k is equal to or greater than 2 and if a number of images classified to the k-th node is larger than that classified to a brother node of the k-th node as a result of classifying images acquired with respect to a parent node of the k-th node based on a determined feature ID and a determined threshold for the parent node and then allocating the specific feature ID and the specific threshold in nodes, which have depth equal to the k-th node of the classification tree.

In accordance with another aspect of the present invention, there is provided a method for supporting to detect an object in test images by using a rejector, including steps of: (a) the rejector acquiring the test image; and (b) the rejector classifying the acquired test images by using at least one already formed classification tree through processes of: (1) acquiring or supporting to acquire p features from mk respective positive images and nk respective negative images as a training set if the mk positive images and the nk negative images are acquired with respect to a k-th node (k>=1 as an integer) of the classification tree and (2) (i) deciding or supporting to decide a feature ID and a threshold by which a minimum classification error is derived by referring to a histogram of features of m1 positive images and that of features of n1 negative images if the number k is 1, wherein the feature ID is selected among the p feature IDs; and (ii) deciding or supporting to decide a specific feature ID and a specific threshold by which a minimum classification error is derived by referring to a histogram of features of the mk positive images and that of features of the nk negative images if the number k is equal to or greater than 2 and if a number of images classified to the k-th node is larger than that classified to a brother node of the k-th node as a result of classifying images acquired with respect to a parent node of the k-th node based on a determined feature ID and a determined threshold for the parent node and then allocating the specific feature ID and the specific threshold in nodes, which have depth equal to the k-th node of the classification tree.

In accordance with still another aspect of the present invention, there is provided a rejector for forming at least one classification tree with training images, including: a communication part for acquiring mk positive images and nk negative images with respect to a k-th node (k>=1 as an integer) of the classification tree; and a processor for acquiring or supporting to acquire p features from the mk respective positive images and the nk respective negative images, and performing processes of: (i) deciding or supporting to decide a feature ID and a threshold by which a minimum classification error is derived by referring to a histogram of features of m1 positive images and that of features of n1 negative images if the number k is 1, wherein the feature ID is selected among the p feature IDs; and (ii) deciding or supporting to decide a specific feature ID and a specific threshold by which a minimum classification error is derived by referring to a histogram of features of the mk positive images and that of features of the nk negative images if the number k is equal to or greater than 2 and if a number of images classified to the k-th node is larger than that classified to a brother node of the k-th node as a result of classifying images acquired with respect to a parent node of the k-th node based on a determined feature ID and a determined threshold for the parent node and then allocating the specific feature ID and the specific threshold in nodes, which have depth equal to the k-th node of the classification tree.

In accordance with still yet another aspect of the present invention, there is provided a rejector for supporting to detect an object in test images, including: a communication part for acquiring the test image; a processor for classifying the acquired test images by using at least one already formed classification tree through processes of: (1) acquiring or supporting to acquire p features from mk respective positive images and nk respective negative images as a training set if the mk positive images and the nk negative images are acquired with respect to a k-th node (k>=1 as an integer) of the classification tree and (2) (i) deciding or supporting to decide a feature ID and a threshold by which a minimum classification error is derived by referring to a histogram of features of m1 positive images and that of features of n1 negative images if the number k is 1, wherein the feature ID is selected among the p feature IDs; and (ii) deciding or supporting to decide a specific feature ID and a specific threshold by which a minimum classification error is derived by referring to a histogram of features of the mk positive images and that of features of the nk negative images if the number k is equal to or greater than 2 and if a number of images classified to the k-th node is larger than that classified to a brother node of the k-th node as a result of classifying images acquired with respect to a parent node of the k-th node based on a determined feature ID and a determined threshold for the parent node and then allocating the specific feature ID and the specific threshold in nodes, which have depth equal to the k-th node of the classification tree.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
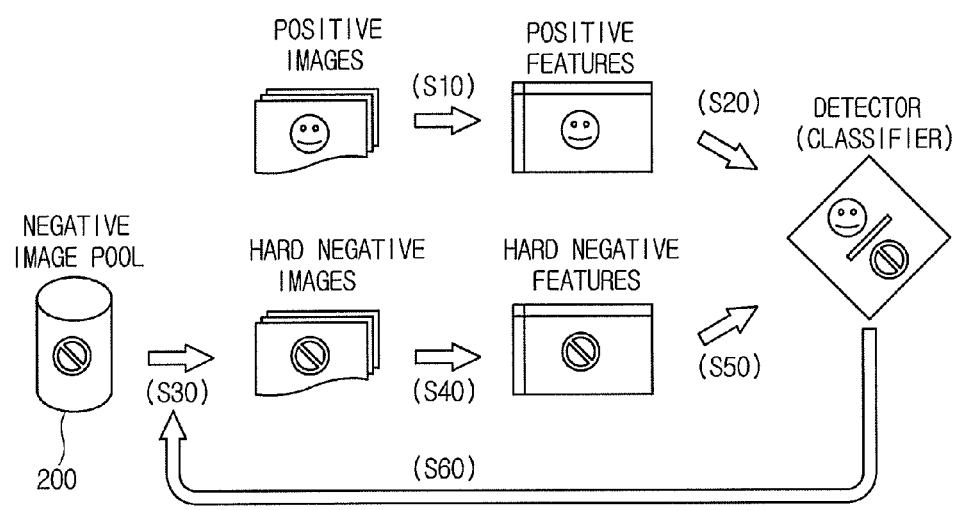
FIG. 1 is a drawing exemplarily illustrating a course of classifying objects with a classifier according to a conventional art.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 2:
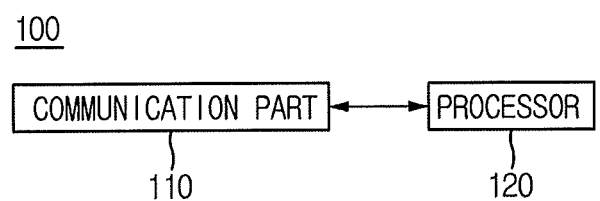
FIG. 2 is a block diagram showing a configuration of a rejector which is learned by forming a classification tree in use of training images in accordance with one example embodiment of the present invention.
Figure 3:
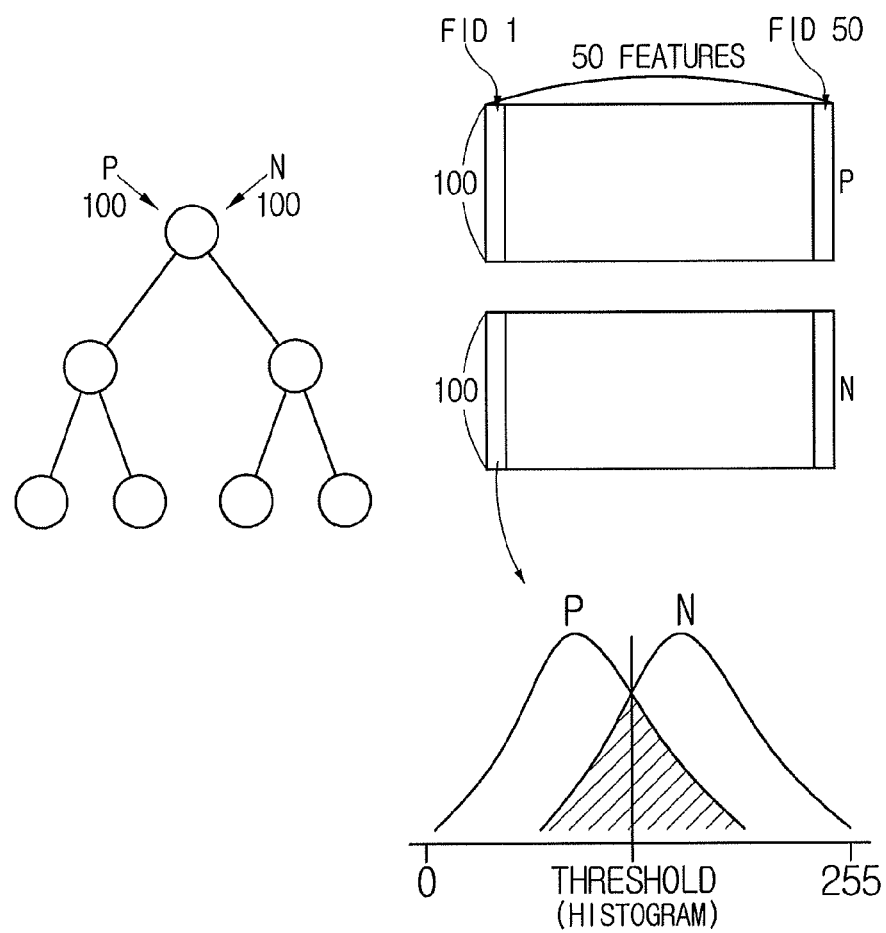
FIG. 3 is a diagram for explaining how to determine a feature ID and a threshold for a node in a classification tree in accordance with one example embodiment of the present invention.

To allow those skilled in the art to the present invention to be carried out easily, the example embodiments of the present invention by referring to attached diagrams will be explained in detail as follows:

FIG. 2 is a block diagram showing a configuration of a rejector which is learned by forming a classification tree in use of training images in accordance with one example embodiment of the present invention. FIG. 3 is a diagram for explaining how to determine a feature ID and a threshold for a node in a classification tree in accordance with one example embodiment of the present invention.

By referring to FIG. 2, a rejector 100 in accordance with one example embodiment of the present invention includes a communication part 110 and a processor 120.

The communication part 110 may acquire training images. More specifically, the communication part 110 may acquire m1 positive images and n1 negative images with respect to a 1-st node, i.e., a root node, of the classification tree. Then, mk positive images and nk negative images are distributed to a k-th node (k>=2 as an integer) of the classification tree.

The processor 120 may acquire or support to acquire p features from the mk respective positive images and the nk respective negative images. At the time, the processor 120 may construct or support to construct an mk*p matrix and an nk*p matrix. FIG. 3 illustrates a case in which 100 positive images and 100 negative images are acquired for a root node in the classification tree. On assumption that 50 features are extracted from the respective positive images and the respective negative images, a 100*50 positive image matrix and a 100*50 negative image matrix may be constructed, as illustrated in FIG. 3.

The processor 120 may perform a process of deciding or supporting to decide a feature ID and a threshold by which a minimum classification error is derived by referring to a histogram of features of m1 positive images and that of features of n1 negative images if the number k is 1, wherein the feature ID is selected among the p feature IDs. Specifically, the processor 120 may create or support to create a histogram of positive images by using features of a m1*p matrix by each feature ID and a histogram of negative images by using features of the n1*p matrix by each feature ID. Then, the processor may decide or support to decide a feature ID by which a minimum classification error is derived by referring to a point of contact of the histograms of the positive images and the negative images, and decide or support to decide a feature value at the time as a threshold. In an example in FIG. 3, it may create the histograms of the positive images and the negative images by using (positive and negative) features, i.e., feature IDs 1 to 50, of a 100*50 matrix and decide a feature ID by which a minimum classification error is derived among them, and a feature value corresponding to the decided feature ID as a threshold. In FIG. 3, a shaded area of the histograms corresponds to the minimum classification error.

If the number k is equal to or greater than 2, and a number of images classified to the k-th node is larger than that classified to a brother node of the k-th node as a result of classifying images acquired with respect to a parent node of the k-th node based on a determined feature ID and a determined threshold for the parent node, just as shown in the above case, the processor 120 may decide or support to decide a specific feature ID and a specific threshold by which a minimum classification error is derived by referring to a histogram of features of the mk positive images and that of features of the nk negative images. In the case, the processor 120 may allocate the specific feature ID and the specific threshold to nodes, which have depth equal to the k-th node of the classification tree, instead of performing the aforementioned process.

Figure 4:
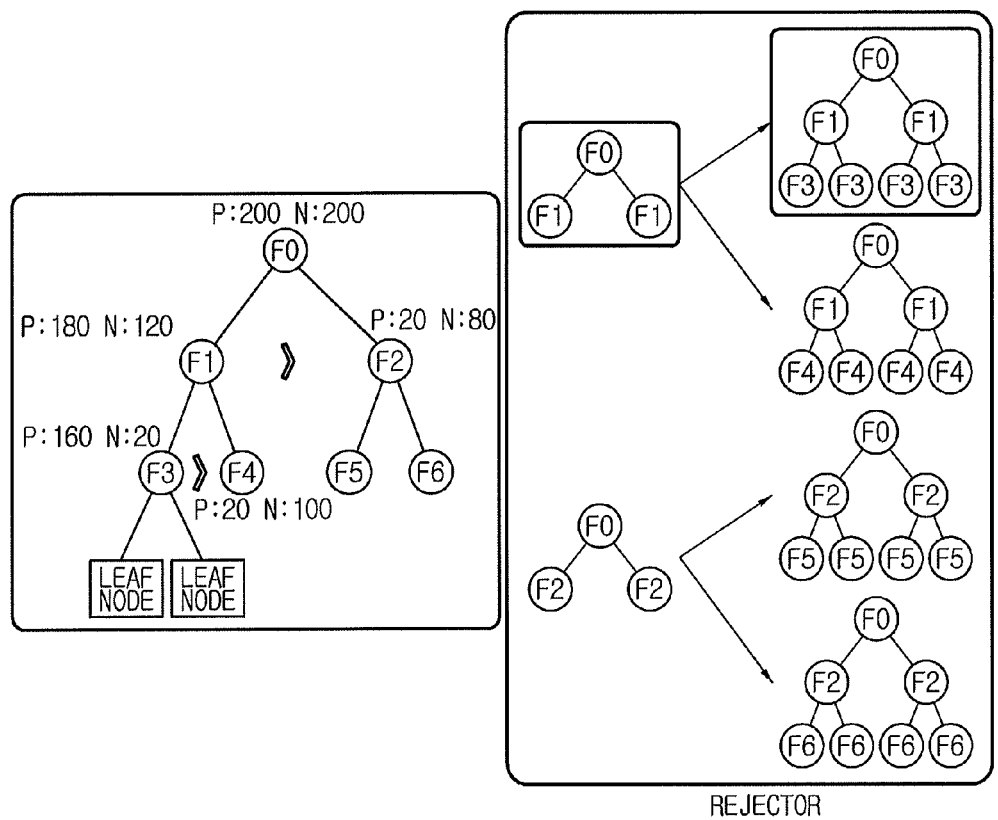
FIG. 4 is a drawing illustrating an example of configuring a classification tree in accordance with a method of the present invention.

FIG. 4 is a drawing illustrating an example of configuring a classification tree in accordance with a method of the present invention.

By referring to FIG. 4, it can be found out that: 200 positive images and 200 negative images are acquired at an initial stage; a feature ID and a threshold by which a minimum classification error is derived are decided by referring to histograms of features of the 200 respective positive images and the 200 respective negative images; accordingly, as a result of classifying the 200 positive images and the 200 negative images by using the decided feature ID and the decided threshold, 180 positive images and 120 negative images are classified to a f1 node as a left child node of a f0 node and 20 positive images and 80 negative images are classified to a f2 node as a right child node of the f0 node. At the time, a task for the f1 node may be executed similarly to that for the f0 node because a number of images classified to the f1 node is larger than that classified to the f2 node, i.e., a brother node of the f1 node. In other words, for the f1 node, a specific feature ID and a specific threshold by which a minimum classification error is derived are decided by referring to histograms of features of the 180 positive images and the 120 negative images. But the specific feature ID and the specific threshold are allocated to the f2 node because the f2 node has a depth equal to the f1 node.

Similarly to the aforementioned case, as a number of images classified to a f3 node as a left child node of the f1 node is larger than that classified to a f4 node as a right child node of the f1 node, a certain feature ID and a certain threshold are decided for the f3 node and the certain feature ID and the certain threshold are allocated to nodes, i.e., the f4 node, a f5 node, and a f6 node, with a same depth as the f3 node.

The example in FIG. 4 assumes that a total weighted value is 400 by considering the 200 acquired positive images and the 200 acquired negative images at the initial stage, but actually the total weighted value may be calculated after being normalized as 1.

The processor 120 may calculate or support to calculate scores for leaf nodes of the classification tree by referring to information on positive images and negative images classified to the leaf nodes. Through a total score acquired by adding respective scores for the leaf nodes in the classification tree, whether an object is a specified object, e.g., a person, or not may be determined. The score may be calculated through the following formula:

$$\text{score}=\max(-t,\min(t,0.5*\log(\text{prior}/(1-\text{prior})))) \quad \text{<Formula>}$$

where $$\text{prior}=P/(P+N)$$

P: A number of positive images classified to the leaf node;

N: A number of negative images classified to the leaf node; and t: A value related to a weighted value.

t may depend on a sum of the number of positive images and the number of negative images, i.e., the weighted value. For example, if the weighted value is small, t may be reduced.

As another example, scores may be calculated under the above-mentioned formula only for a certain number of leaf nodes, among all the leaf nodes of the classification tree, whose weighted value, i.e., a sum of a number of positive images and a number of negative images, is relatively large and scores for the other leaf nodes may be set to 0. For example, the score may be calculated only for the two leaf nodes whose weighted value is the largest two values.

As still another example, a value of multiplying a score calculated under the aforementioned formula by a weighted value may be also determined as a final score.

The classification tree constructed by using a method of the present invention as shown above has excellent characteristics in that it has same feature IDs and same thresholds irrespective of a traversing order. Such characteristics, for example, may be represented as [fa, fb, fc]=[fb, fc, fa]. In other words, for respective [fa, fb, fc], respective results of classifying inputted images by referring to feature IDs and thresholds corresponding to the feature IDs may be represented as 0 or 1. Thus, a score may be not only obtained by applying fa, fb, and fc in order but also obtained by applying fb, fc, and fa in order and then rearranging 0 or 1, acquired as a result of applying fb, fc, and fa in order, according to the order of fa, fb, and fc.

Figure 5:
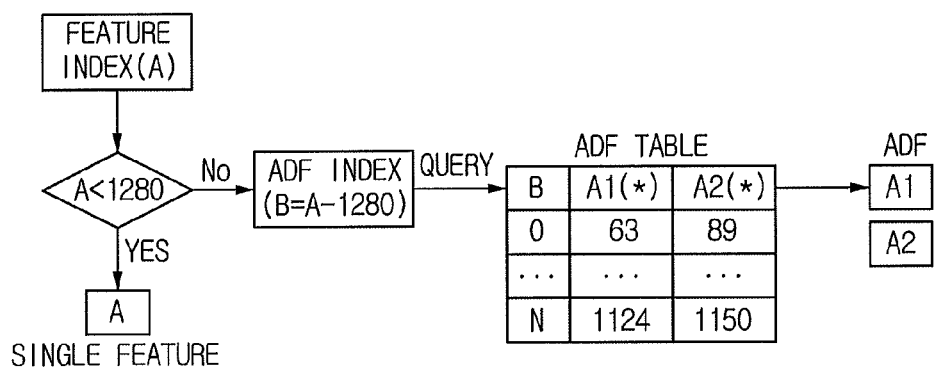
FIG. 5 is a diagram for explaining how to acquire a feature in accordance with one example embodiment of the present invention.

FIG. 5 is a diagram for explaining how to acquire a feature in accordance with one example embodiment of the present invention.

The processor 120 may acquire or support to acquire the p features by extracting at least some of single features and absolute difference features with respect to the mk positive images and the nk negative images, respectively.

By referring to FIG. 5, it may be found out that while a single feature is acquired if a feature index (a feature ID) is smaller than 1280, a value of absolute difference of two arbitrary single features may be acquired by referring to an ADF table if the feature index is equal to or larger than 1280.

The processor 120 performs a function of controlling flow of data between the communication part 110 and other components. In short, the processor 120 controls the communication part 110 and other components to perform their unique functions by controlling the flow of data among respective components of the apparatus 100.

The processor 120 may include a configuration of a micro processing unit (MPU), a central processing unit (CPU), cache memory, data bus, and other hardware. In addition, it may further include a configuration of an operating system, and software of an application that performs a special purpose.

Meanwhile, after learning the rejector 100, test images may be acquired by the system for supporting an object recognition.

The communication part 110 may acquire test images.

The processor 120 may classify the acquired test images by using at least one already formed classification tree through processes of: (1) acquiring or supporting to acquire p features from mk respective positive images and nk respective negative images as a training set if the mk positive images and the nk negative images are acquired with respect to a k-th node (k>=1 as an integer) of the classification tree and (2) (i) deciding or supporting to decide a feature ID and a threshold by which a minimum classification error is derived by referring to a histogram of features of m1 positive images and that of features of n1 negative images if the number k is 1, wherein the feature ID is selected among the p feature IDs; and (ii) deciding or supporting to decide a specific feature ID and a specific threshold by which a minimum classification error is derived by referring to a histogram of features of the mk positive images and that of features of the nk negative images if the number k is equal to or greater than 2 and if a number of images classified to the k-th node is larger than that classified to a brother node of the k-th node as a result of classifying images acquired with respect to a parent node of the k-th node based on a determined feature ID and a determined threshold for the parent node and then allocating the specific feature ID and the specific threshold in nodes, which have depth equal to the k-th node of the classification tree. Thereafter, the rejector 100 may allow a detector (shown in FIG. 6) to detect an object in the test image based on the above-mentioned classification result.

Figure 6:
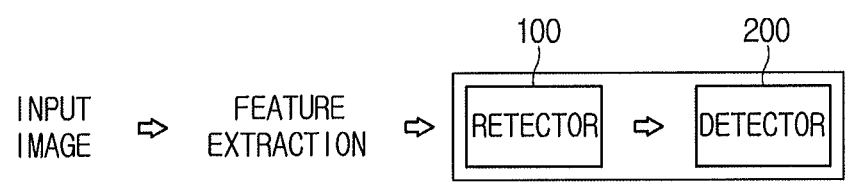
FIG. 6 is a diagram representing steps of detecting an object by using the rejector and a detector in a system for supporting an object recognition in accordance with the present invention.

FIG. 6 is a diagram representing steps of detecting an object by the rejector and a detector included in a system for supporting an object recognition in accordance with the present invention.

If the communication part 110 of the rejector 100 acquires test images or features extracted from the test images, the rejector 100 may preferentially classify the test images rapidly and roughly by using the classification tree constructed as mentioned above, and then output the result of the rough classification to the detector 200. Since the detector 200 can use the result of the rough classification, the detector 200 can classify the test images very speedily, and thereby detect an object in the test images very efficiently.

As such, the present invention may improve the speed of the object detection while maintaining the accuracy of the object detection by placing the rejector 100 which is light and fast at the front-end of the detector 200. For example, the rejector 100 may preferentially distinguish regions which have possibilities of including objects and those which have no possibility or very low possibilities thereof.

By the way, the rejector 100 in accordance with the present invention has a characteristic of fast parallel processing by referring to an order of identical feature IDs and identical thresholds with respect to consecutive test images regardless of a path of the classification tree.

Figure 7:
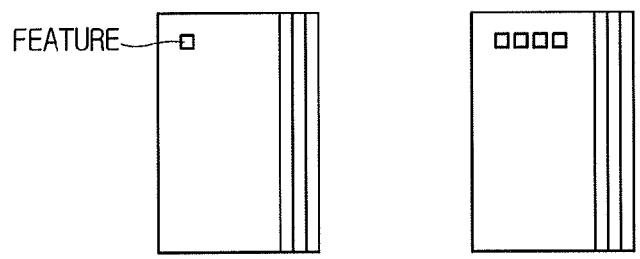
FIG. 7 is a diagram for explaining why the rejector in accordance with the present invention is appropriate for a parallel processing.

FIG. 7 is a diagram for explaining why the rejector in accordance with the present invention is appropriate for a parallel processing.

For example, on assumption that a person is searched from an inputted image by using a learned model, the processor 120 may make a patch by cutting the image in a size as large as the model and apply the learned model to the patch. In general, in case of a conventional detector, it is difficult to apply a parallel processing because feature IDs and thresholds, which must be referred to, continue to be changed if a path of the classification tree is changed. Contrarily, the rejector 100 in accordance with the present invention can perform the parallel processing rapidly for the consecutive image patches because the feature IDs and the thresholds allocated to nodes are same if the nodes have a same depth in the classification tree. It can be found out that features are located consecutively in the consecutive images as illustrated in FIG. 7. Therefore, the rejector 100 in accordance with the present invention could determine a certain object rapidly because it is fit for a SIMD configuration.

Meanwhile, according to examples as mentioned above, processes of forming one (1) classification tree by the rejector 100 is provided but it is not limited thereto. That is, it is natural that the rejector 100 can manage a plurality of classification trees and the detector 200 can also manage multiple classification trees.

The present invention has following effects:

The present invention has an effect of providing a configuration of the rejector that may improve classification speed and effectiveness of object recognition by allocating the identical feature ID and the identical threshold to the nodes which have a same depth in the classification tree.

In addition, the present invention has an effect of improving object detection speed while keeping accuracy of object detection by placing the rejector 100 at the front-end of the detector 200.

Besides, the present invention has an effect of providing a configuration of the rejector 100 that may perform the parallel processing rapidly by referring to the identical feature ID and the identical threshold with respect to the consecutive test images regardless of the path of the classification tree.

The embodiments of the present invention as explained above can be implemented in a form of executable program command through a variety of computer means recordable to computer readable media. The computer readable media may include solely or in combination, program commands, data files, and data configurations. The program commands recorded to the media may be components specially designed for the present invention or may be usable to a skilled human in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for learning a rejector by forming at least one classification tree with training images, comprising steps of:
   (a) acquiring, by using the rejector, p features from mk respective positive images and nk respective negative images if the mk positive images and the nk negative images are acquired with respect to a k-th node (k>=1 as an integer) of the at least one classification tree; and
   (b) performing, by using the rejector, processes of: (i) deciding, by using the rejector, a feature ID and a threshold by which a minimum classification error is derived by referring to a histogram of features of m1 positive images and that of features of n1 negative images if the number k is 1, wherein the feature ID is selected among the p feature IDs; and (ii) deciding, by using the rejector, a specific feature ID and a specific threshold by which a minimum classification error is derived by referring to a histogram of features of the mk positive images and that of features of the nk negative images if the number k is equal to or greater than 2 and if a number of images classified to the k-th node is larger than that classified to a brother node of the k-th node as a result of classifying images acquired with respect to a parent node of the k-th node based on a determined feature ID and a determined threshold for the parent node and then allocating the specific feature ID and the specific threshold in nodes, which have depth equal to the k-th node of the at least one classification tree.

2. The method of claim 1, wherein the step of (a) includes a step of: constructing, by using the rejector, an mk*p matrix and an nk*p matrix by acquiring p features from the respective mk positive images and p features from the respective nk negative images if the mk positive images and the nk negative images are acquired with respect to the k-th node of the classification tree; and wherein the step of (b) includes a step of: creating, by using the rejector, a histogram of positive images by using features of the mk*p matrix and a histogram of negative images by using features of the nk*p matrix by each feature ID and thereby deciding a feature ID by which a minimum classification error is derived by referring to a point of contact in the histograms of the positive images and the negative images and deciding a feature value at the time as a threshold.

3. The method of claim 1, further comprising a step of:
   (c) calculating, by using the rejector, for leaf nodes of the at least one classification tree by referring to information on positive images and negative images classified to the leaf nodes.

4. The method of claim 3, wherein the scores are calculated, by using the rejector, through the following formula:

$$\text{score}=\max(-t,\min(t,0.5*\log(\text{prior}/(1-\text{prior}))))$$

where $$\text{prior}=P/(P+N);$$

P: A number of positive images classified to the leaf node;
N: A number of negative images classified to the leaf node; and
t: A value related to a weighted value.

5. The method of claim 4, wherein t depends on the weighted value which is derived by adding the number of positive images to the number of negative images.

6. The method of claim 4, wherein the scores are calculated only for a certain number of leaf nodes, among all the leaf nodes of the at least one classification tree, whose weighted value is relatively large under the formula and the scores of the other leaf nodes are set to 0.

7. The method of claim 4, wherein respective values of multiplying the calculated scores by the respective weighted values are determined as respective final scores.

8. The method of claim 1, wherein, at the step of (a), acquiring, by using the rejector, the p features is by extracting at least some of single features and absolute difference features with respect to the mk positive images and the nk negative images, respectively.

9. A method for detecting an object in test images by using a rejector, comprising steps of:
   (a) acquiring, by using the rejector, the test image; and
   (b) classifying, by using the rejector, the acquired test images by using at least one already formed classification tree through processes of: (1) acquiring p features from mk respective positive images and nk respective negative images as a training set if the mk positive images and the nk negative images are acquired with respect to a k-th node (k>=1 as an integer) of the at least one already formed classification tree and (2) (i) deciding a feature ID and a threshold by which a minimum classification error is derived by referring to a histogram of features of m1 positive images and that of features of n1 negative images if the number k is 1, wherein the feature ID is selected among the p feature IDs; and (ii) deciding a specific feature ID and a specific threshold by which a minimum classification error is derived by referring to a histogram of features of the mk positive images and that of features of the nk negative images if the number k is equal to or greater than 2 and if a number of images classified to the k-th node is larger than that classified to a brother node of the k-th node as a result of classifying images acquired with respect to a parent node of the k-th node based on a determined feature ID and a determined threshold for the parent node and then allocating the specific feature ID and the specific threshold in nodes, which have depth equal to the k-th node of the at least one already formed classification tree.

10. The method of claim 9, comprising a step of:
    (c) detecting, by using a detector, an object in the test images based on classification result.

11. The method of claim 9, wherein parallel processing is executed by referring to an identical feature ID and an identical threshold with respect to consecutive test images regardless of a path of the at least one already formed classification tree.

12. A rejector for forming at least one classification tree with training images, comprising:
    a processor for receiving mk positive images and nk negative images with respect to a k-th node (k>=1 as an integer) of the classification tree; and
    a processor for acquiring p features from the mk respective positive images and the nk respective negative images, and performing processes of: (i) deciding a feature ID and a threshold by which a minimum classification error is derived by referring to a histogram of features of m1 positive images and that of features of n1 negative images if the number k is 1, wherein the feature ID is selected among the p feature IDs; and (ii) deciding a specific feature ID and a specific threshold by which a minimum classification error is derived by referring to a histogram of features of the mk positive images and that of features of the nk negative images if the number k is equal to or greater than 2 and if a number of images classified to the k-th node is larger than that classified to a brother node of the k-th node as a result of classifying images acquired with respect to a parent node of the k-th node based on a determined feature ID and a determined threshold for the parent node and then allocating the specific feature ID and the specific threshold in nodes, which have depth equal to the k-th node of the at least one classification tree.

13. The rejector of claim 12, wherein the processor constructs an mk*p matrix and an nk*p matrix by acquiring p features from the respective mk positive images and p features from the respective nk negative images if the mk positive images and the nk negative images are acquired with respect to the k-th node of the classification tree and creates a histogram of positive images by using features of the mk*p matrix and a histogram of negative images by using features of the nk*p matrix by each feature ID and thereby deciding a feature ID by which a minimum classification error is derived by referring to a point of contact in the histograms of the positive images and the negative images and deciding a feature value at the time as a threshold.

14. The rejector of claim 12, wherein the processor calculates scores for leaf nodes of the at least one classification tree by referring to information on positive images and negative images classified to the leaf nodes.

15. The rejector of claim 14, wherein the processor calculates the scores through the following formula:

$$\text{score}=\max(-t,\min(t,0.5*\log(\text{prior}/(1-\text{prior}))))$$

where $$\text{prior}=P/(P+N)$$

P: A number of positive images classified to the leaf node;
N: A number of negative images classified to the leaf node; and
t: A value related to a weighted value.

16. The rejector of claim 15, wherein t depends on the weighted value which is derived by adding the number of positive images to the number of negative images.

17. The rejector of claim 15, wherein the scores are calculated only for a certain number of leaf nodes, among all the leaf nodes of the at least one classification tree, whose weighted value is relatively large under the formula and the scores of the other leaf nodes are set to 0.

18. The rejector of claim 15, wherein respective values of multiplying the calculated scores by the respective weighted values are determined as respective final scores.

19. The rejector of claim 12, wherein the rejector acquires the p features by extracting at least some of single features and absolute difference features with respect to the mk positive images and the nk negative images, respectively.

20. A rejector for detecting an object in test images, comprising:
    a processor for receiving the test images;
    a processor for classifying the acquired test images by using at least one already formed classification tree through processes of: (1) acquiring p features from mk respective positive images and nk respective negative images as a training set if the mk positive images and the nk negative images are acquired with respect to a k-th node (k>=1 as an integer) of the one already formed classification tree and (2) (i) deciding a feature ID and a threshold by which a minimum classification error is derived by referring to a histogram of features of m1 positive images and that of features of n1 negative images if the number k is 1, wherein the feature ID is selected among the p feature IDs; and (ii) deciding a specific feature ID and a specific threshold by which a minimum classification error is derived by referring to a histogram of features of the mk positive images and that of features of the nk negative images if the number k is equal to or greater than 2 and if a number of images classified to the k-th node is larger than that classified to a brother node of the k-th node as a result of classifying images acquired with respect to a parent node of the k-th node based on a determined feature ID and a determined threshold for the parent node and then allocating the specific feature ID and the specific threshold in nodes, which have depth equal to the k-th node of the one already formed classification tree.

21. The rejector of claim 20, wherein a detector detects an object in the test images based on classification result.

22. The rejector of claim 20, wherein parallel processing is executed by referring to an identical feature ID and an identical threshold with respect to consecutive test images regardless of a path of the at least one already formed classification tree.

\* \* \* \* \*